(12) United States Patent
Beidas et al.

(10) Patent No.: US 6,680,987 B1
(45) Date of Patent: Jan. 20, 2004

(54) FADING COMMUNICATIONS CHANNEL ESTIMATION AND COMPENSATION

(75) Inventors: Bassel F. Beidas, Alexandria, VA (US); Long Huynh, San Diego, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 704 days.

(21) Appl. No.: 09/634,018

(22) Filed: Aug. 8, 2000

Related U.S. Application Data (60) Provisional application No. 60/148,036, filed on Aug. 10, 1999.

(51) Int. Cl.[7] .................................................. H04D 1/00
(52) U.S. Cl. ........................ 375/343; 375/142; 375/143
(58) Field of Search ................................. 375/316, 324, 375/340, 343, 142, 143; 714/752, 761, 762, 786–788

(56) References Cited

U.S. PATENT DOCUMENTS

| | | | | |
|---|---|---|---|---|
| 6,002,716 A | * | 12/1999 | Meyer et al. | ................ 375/231 |
| 6,028,852 A | * | 2/2000 | Miya et al. | ................ 370/335 |
| 6,069,912 A | * | 5/2000 | Sawahashi et al. | ......... 375/142 |
| 6,072,841 A | * | 6/2000 | Rahnema | .................... 375/325 |
| 6,130,859 A | * | 10/2000 | Sonnenschein et al. | ..... 367/134 |
| 6,519,296 B1 | * | 2/2003 | Hladik | ....................... 375/325 |

FOREIGN PATENT DOCUMENTS

| | | | | |
|---|---|---|---|---|
| WO | WO97/20400 | * | 6/1997 | ............ H04B/7/08 |

* cited by examiner

*Primary Examiner*—Mohammad H. Ghayour
*Assistant Examiner*—Kevin M Burd
(74) *Attorney, Agent, or Firm*—John T. Whelan; Michael Sales

(57) ABSTRACT

A method for estimating and compensating for a fading communications channel includes the steps of generating matched filter data from a received data burst, interpolating between reference symbols to generate a fading channel estimate from the matched filter data, applying a phase correction to the matched filter data from the fading channel estimate to recover free data from the matched filter data, and performing decision feedback on the free data to improve the fading channel estimate.

11 Claims, 10 Drawing Sheets

FADING COMMUNICATIONS CHANNEL ESTIMATION AND COMPENSATION

This application claims priority under 35 U.S.C. §119(e) to U.S. Provisional Patent Application Ser. No. 60/148,036, filed Aug. 10, 1999, of Beidas, et al., for SUPERIOR METHOD FOR FADING CHANNEL ESTIMATION AND COMPENSATION, incorporated herein by reference.

BACKGROUND OF THE INVENTION

The present invention relates generally to methods for coherently demodulating information symbols from communication signal bursts subject to fading communications channel distortion. More specifically, but without limitation thereto, the present invention relates to a method for estimating a fading communications channel.

Reasons for experiencing fading in mobile communications include multiple scattering of the radio waves by structures in the vicinity of a mobile unit. Each scattered component plane wave has an associated Doppler shift that depends on the mobile unit speed, the carrier frequency, etc. Estimating and compensating for fading communications channel gain is desirable so that a communications system may coherently demodulate a burst of transmitted information symbols. A problem with current block phase estimation (BPE) techniques is the introduction of non-linearities in removing the modulation that may result in substantial degradation of performance in the presence of strong fading channels.

Another approach uses single reference symbols distributed uniformly within a data burst for a communications channel with Rayleigh fading. In Rayleigh fading, all the signal energy is distributed in scattered paths. Because satellite communications are characterized by a direct, line-of-sight signal path that is not scattered, it would be preferable to use a fading channel model that accommodates combinations of scattered and unscattered or dominant path signals.

SUMMARY OF THE INVENTION

The present invention advantageously addresses the needs above as well as other needs by providing a method and apparatus for estimating and compensating for a fading communications channel.

In one embodiment, the invention may be characterized as a method for estimating and compensating for a fading communications channel that includes the steps of generating matched filter data from a received data burst, interpolating between reference symbols to generate a fading channel estimate from the matched filter data, applying a phase correction to the matched filter data from the fading channel estimate to recover free data from the matched filter data, and performing decision feedback on the free data to improve the fading channel estimate.

In another embodiment, the invention may be characterized as an apparatus for estimating and compensating for a fading communications channel that includes a matched filter for generating matched filter data from a received data burst, a reference symbol interpolator coupled to the matched filter for interpolating between reference symbols to generate a fading channel estimate from the matched filter data, a first fading channel compensator coupled to the matched filter for applying a phase correction to the matched filter data from the fading channel estimate to generate phase corrected data, and a first demodulator coupled to the fading channel compensator for demodulating free data from the phase corrected data.

The features and advantages summarized above in addition to other aspects of the present invention will become more apparent from the description, presented in conjunction with the following drawings.

BRIEF DESCRIPTION OF THE DRAWINGS

The above and other aspects, features and advantages of the present invention will be more apparent from the following more specific description thereof, presented in conjunction with the following drawings wherein.

Corresponding reference characters indicate corresponding elements throughout the several views of the drawings.

DETAILED DESCRIPTION OF THE DRAWINGS

The following description is presented to disclose the currently known best mode for making and using the present invention. The scope of the invention is defined by the claims.

For purposes of illustrating how the present invention may be used in a specific application, the message format and the modulation scheme of a typical mobile satellite system is assumed. The received data burst waveform may be expressed in complex form as $$r(t)=c(t) \cdot s(t)+n(t) \quad (1)$$

where the accompanying noise n(t) is additive white Gaussian noise (AWGN) with a power spectral density (PSD) level of $N_0/2$ (Watts/Hz). The complex channel gain c(t) follows a Rician fading model with a Rice factor $K_{rician}$ defined as the ratio of direct path power to multi-path power by the formula $$c(t) = \sqrt{\frac{K_{rician}}{K_{rician}+1}} + \sqrt{\frac{1}{K_{rician}+1}} \cdot g(t) \quad (2)$$

where g(t) is a complex zero-mean Gaussian fading process with a variance of unity. The auto-correlation function associated with this channel is given by $$R_c(T) = \sqrt{\frac{K_{rician}}{K_{rician}+1}} + \sqrt{\frac{1}{K_{rician}+1}} \cdot J_0(2\pi f_D T) \quad (3)$$

where $f_D$ is the Doppler spread or single-sided fading bandwidth, and $J_0(x)$ is the Bessel function of order zero.

For an encoded speech or traffic channel (TCH) burst, the signal s(t) in equation (1) may be represented by $$s(t) = \tilde{S}_{QPSK}(t-\epsilon T_S) \cdot e^{j(2\pi \Delta f t + \theta_c)} \quad (4)$$

where $\epsilon$ denotes the normalized timing offset, $\Delta f$ is the carrier frequency drift introduced by the channel, $\theta_c$ is the initial carrier phase assumed to be uniformly distributed over [ç,–ç] and $T_s$ is the symbol period ($1/T_s$ is the symbol rate). The quadrature phase shift keying (QPSK) modulation $\tilde{S}_{QRSK}$ is given by $$\tilde{S}_{QPSK} = \sqrt{S} \sum_k \alpha_k \cdot h(t - kT_S) \quad (5)$$

where S is the signal power, $\{\alpha_k\}$ are the data symbols which are conveyed via phase information according $$\text{to } \alpha_k = e^{j\theta_k}, \ \theta_k \varepsilon \left\{\frac{2\pi \cdot i}{4}; \ i=0,1,2,3\right\}, \quad (6)$$

and h( ) is a pulse shaping function.

Figure 1:
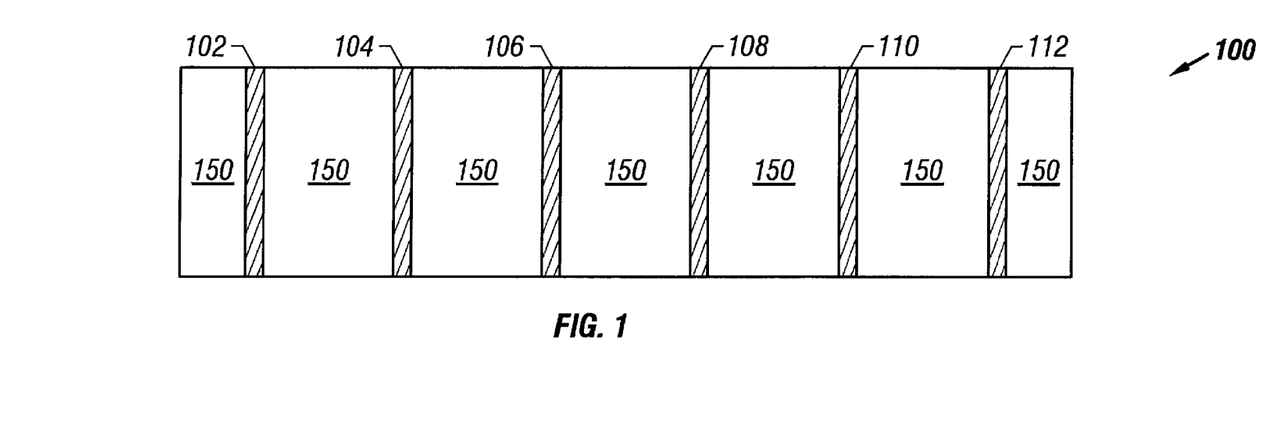
FIG. 1 is a diagram of a typical traffic channel data burst according to an embodiment of the present invention.

FIG. 1 is a diagram of a typical traffic channel (TCH) data burst 100. Shown are reference symbol sets 102, 104, 106, 108, 110, and 112, and free data 150. The traffic channel data burst 100 may be used with, for example, quadrature phase shift keying (QPSK) modulation and six reference symbol sets 102, 104, 106, 108, 110, and 112 distributed at equal intervals between the free data symbols 150. Each of the reference symbol sets 102, 104, 106, 108, 110, and 112 typically contains two symbols, however, other sets containing an arbitrary number of reference symbols distributed at non-uniform intervals between the free data 150 may also be used to practice the present invention.

The capability of accommodating a varying number of reference symbols at varying intervals between the free data within the data burst is a distinguishing feature from conventional methods that require a single reference symbol to be inserted at equal intervals within a data burst.

Figure 2:
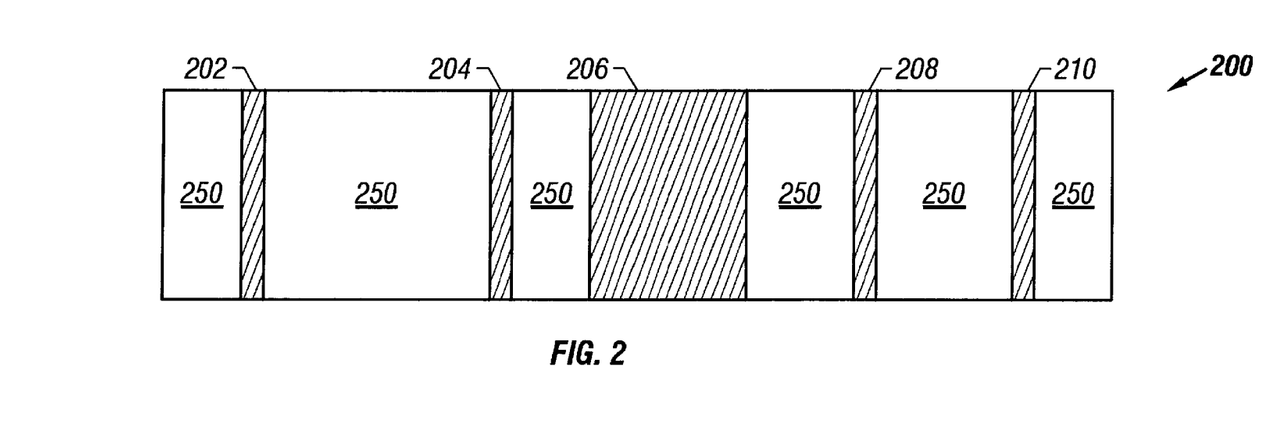
FIG. 2 is a diagram of a typical broadcast channel data burst according to another embodiment of the present invention.

FIG. 2 is a diagram of a typical broadcast channel (BCCH) data burst 200. Shown are reference symbol sets 202, 204, 206, 208, and 210, and free data 250. The broadcast channel data burst 200 may be used with, for example, binary phase shift keying (BPSK) modulation and the five reference symbol sets 202, 204, 206, 208, and 210 distributed non-uniformly between the free data 250. The binary phase shift keying modulation may be expressed as described for quadrature phase shift keying in equation (5) except that the data symbols $\{\alpha_k\}$ take on the values ±1. The reference symbol sets 202, 204, 206, 208, and 210 may be non-uniformly distributed between the free data 250 and may also be clustered within the broadcast channel data burst 200 as shown in FIG. 2 or equally distributed in equal numbers between the free data 250 as shown for the traffic channel data burst 100 in FIG. 1.

Again, the capability of accommodating a varying number of reference symbols at varying intervals within the data burst is a distinguishing feature from conventional methods that require reference symbols to be inserted only at equal intervals and in equal numbers within a data burst. Varying the interval of the reference symbols between the free data advantageously allows a better channel estimate in critical areas of the data burst while tolerating a nominal channel estimate in areas of the data that are not as critical.

The pulse shaping function h( ) may be provided by the root-raised cosine function with a roll-off parameter of, for example, 0.4 and may be expressed in the time domain as $$h(t) = \frac{T_S/4\alpha}{\pi((T_S/4\alpha)^2 - t^2)} \left\{ \cos\left(\frac{(1+\alpha)\pi}{T_S}t\right) + \frac{T_S}{4\alpha \cdot t} \sin\left(\frac{(1-\alpha)\pi}{T_S}t\right) \right\} \quad (7)$$

The root-raised cosine is known to be a tightly band-limited pulse that satisfies the Nyquist criterion of zero inter-symbol interference (ISI) when sampled in time-synchronism. Other pulse shaping functions may also be used according to techniques well known in the art.

Figure 3:
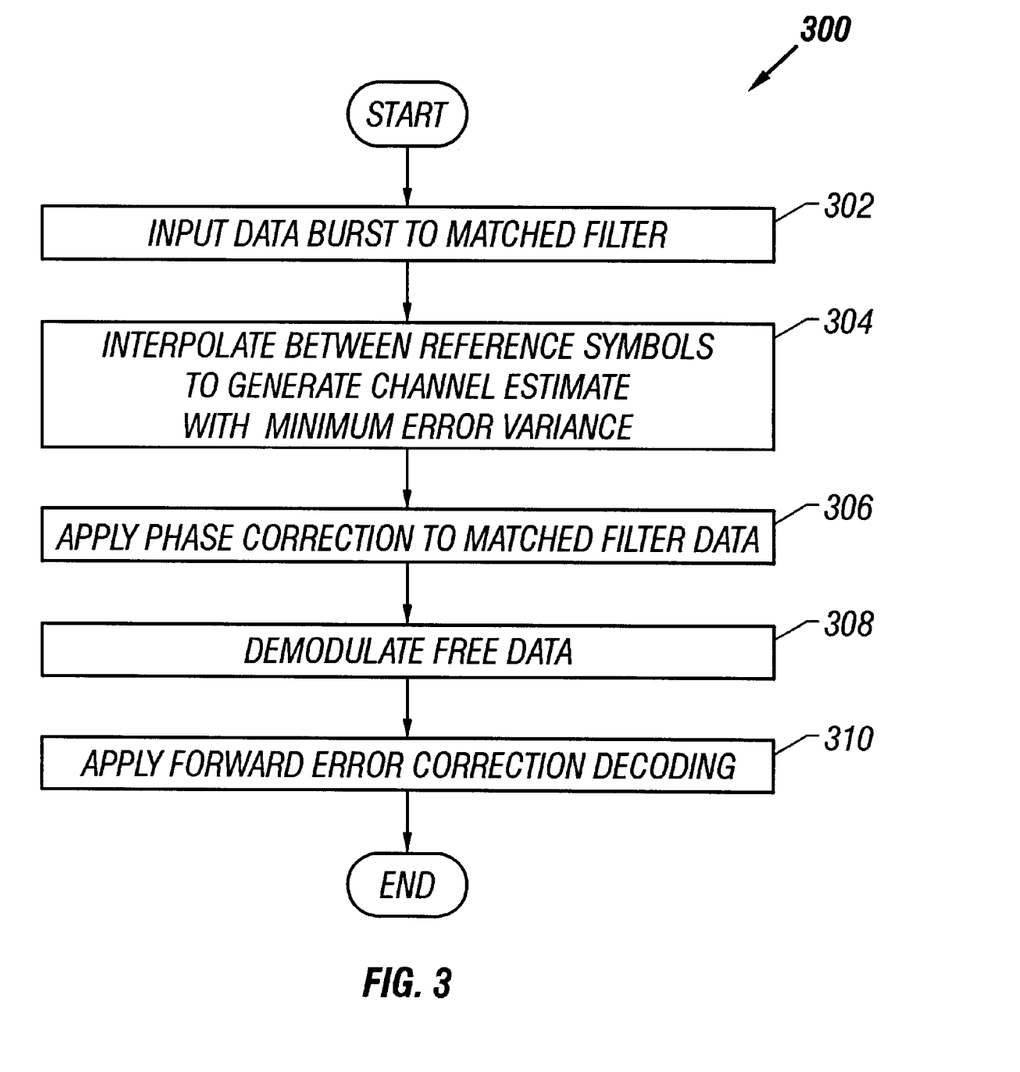
FIG. 3 is a flow chart of an exemplary method for estimating and compensating for a fading channel according to a further embodiment of the invention.

FIG. 3 is a flow chart of an exemplary method 300 for estimating and compensating for a fading channel. The initial step is to input a received data burst to a matched filter at step 302 to generate matched filter data having a maximum signal-to-noise ratio. The matched filter data is then interpolated between the reference symbol sets by a minimum mean squared error linear filter at step 304 to generate a fading channel estimate with minimum error variance. The interpolation coefficients for the case of quadrature phase shift keying modulation in a Rician fading channel may be calculated according to the following example.

A performance parameter $Y_b$ may be defined as the per-bit signal-to-noise ratio (SNR) by $$\gamma_b = \frac{1}{2} \cdot \frac{ST_S}{N_0} \quad (8)$$

The matched filter output sampled in time-synchronism may be modeled as $$r[K] = b_k \cdot u[k] + n[k] \quad (9)$$

where $b_k$ is the kth QPSK information symbol, u[k] is the fading channel gain that is a complex-valued Gaussian process with a mean and variance that may be calculated from equation (2) as $$E\{u[k]\} = \sqrt{\gamma_b \cdot \frac{K_{rician}}{K_{rician} + 1}} \quad (10)$$

$$\sigma^2 = \gamma_b \cdot \frac{1}{K_{rician} + 1} \quad (11)$$

The accompanying noise at the matched filter output n[k] is a zero-mean white Gaussian sequence with a variance that may be normalized to unity without loss in generality.

For the traffic channel case using, for example, the traffic channel data burst 100 in FIG. 1, the two reference symbols in each reference symbol set are averaged into an average reference symbol r̃ to provide an estimate of the channel complex gain according to $$\tilde{r}[k_0 + l \cdot M] = \frac{1}{2} \cdot \left[ \sum_{i=0}^{1} r[k_0 + l \cdot M + (i-1)] \cdot \exp(-j \cdot \theta_{ref}[l]) \right] \quad (12)$$

where in this case $k_0=9$, the number of blocks M=20, and the reference symbol index l=0,1, . . . ,5. Relation (12) yields a group of six averaged pairs of reference symbols that span the entire data burst. Each averaged pair of reference symbols is separated by $MT_s$, and each averaged pair of reference symbols has a signal-to-noise ratio of $4_{\gamma b}$.

Using the reference symbols from relation (12), a linear minimum mean squared error based estimate v[k] of the channel complex gain u[k] at the kth symbol may be represented as $$v[k] = \hat{u}[k] = \sum_{i=0}^{5} \tilde{h}_i^*[k] \cdot \tilde{r}[k_0 + i \cdot M] \quad (13)$$

$$= \bar{h}^H[k] \cdot \bar{r}$$

here in matrix form $$\bar{r} = \begin{bmatrix} \tilde{r}[k_0] \\ \tilde{r}[k_0 + M] \\ \tilde{r}[k_0 + 2 \cdot M] \\ \tilde{r}[k_0 + 3 \cdot M] \\ \tilde{r}[k_0 + 4 \cdot M] \\ \tilde{r}[k_0 + 5 \cdot M] \end{bmatrix} \quad (14)$$

Equation (13) has six filter coefficients that may be determined by minimizing the mean squared error between the channel complex gain and its estimate at the kth symbol, i.e.

$$E\{|u[k] - v[k]|^2\} \quad (15)$$

A set of relations that are satisfied by the optimal coefficients is given by $$R \cdot \bar{h}_{opt}[k] = \bar{w}[k] \quad (16)$$

where R is a 6×6 auto-correlation matrix given by $$R = E\{\bar{r} \cdot \bar{r}^H\} \quad (17)$$

and w̄[k] is a 6×1 covariance vector given by $$\bar{w}[k] = E\{u^*[k] \cdot \bar{r}\} \quad (18)$$

The solution to eq. (16) is then given by $$\bar{h}_{opt}[k] = R^{-1} \cdot \bar{w}[k] \quad (19)$$

The auto-correlation matrix R is independent of the time index k, therefore the inverse $R^{-1}$ is preferably precomputed only once. The amount of residual error contained in the estimate of equation (14) when the optimal filter coefficients are used may be quantified as $$\min E\{|u[k] - v[k]|^2\} = \gamma_b \bar{w}^H[k] \cdot R^{-1} \cdot \bar{w}[k] \quad (20)$$

For the Rician fading case, the individual components of the arrays R and w̄[k] are given by $$R_{lm} = E\{\tilde{r}[k_0 + l \cdot M] \cdot \tilde{r}^*[k_0 + m \cdot M]\} \quad (21)$$

$$= \gamma_b \cdot |\bar{b}|^2 \cdot \tilde{R}_c((l-m) \cdot MT_S) + 0.25 \cdot \delta - lm \quad \text{and}$$

$$w_l[k] = E\{u^*[k] \cdot \tilde{r}[k_0 + l \cdot M]\} \quad (22)$$

$$= \gamma_b \cdot \bar{b} \cdot \tilde{R}_c((k_0 + l \cdot M - k) \cdot T_S)$$

where $\delta_{lm}$ is the Kronecker delta function and $\tilde{R}_c(\tau)$ is the auto-correlation function of the Rician fading channel, i.e.

$$\tilde{R}_c(T) = \frac{K_{rician}}{K_{rician} + 1} + \frac{1}{K_{rician} + 1} J_0(2\pi f_d T) \quad (23)$$

A phase correction is applied from the fading channel estimate v[k] at step 306 to the matched filter data to generate phase corrected data. The phase corrected data symbols are demodulated at step 308 to strip the free data from the phase corrected data. If desired, forward error correction decoding may be applied to the free data at step 310 according to well known techniques.

Figure 4:
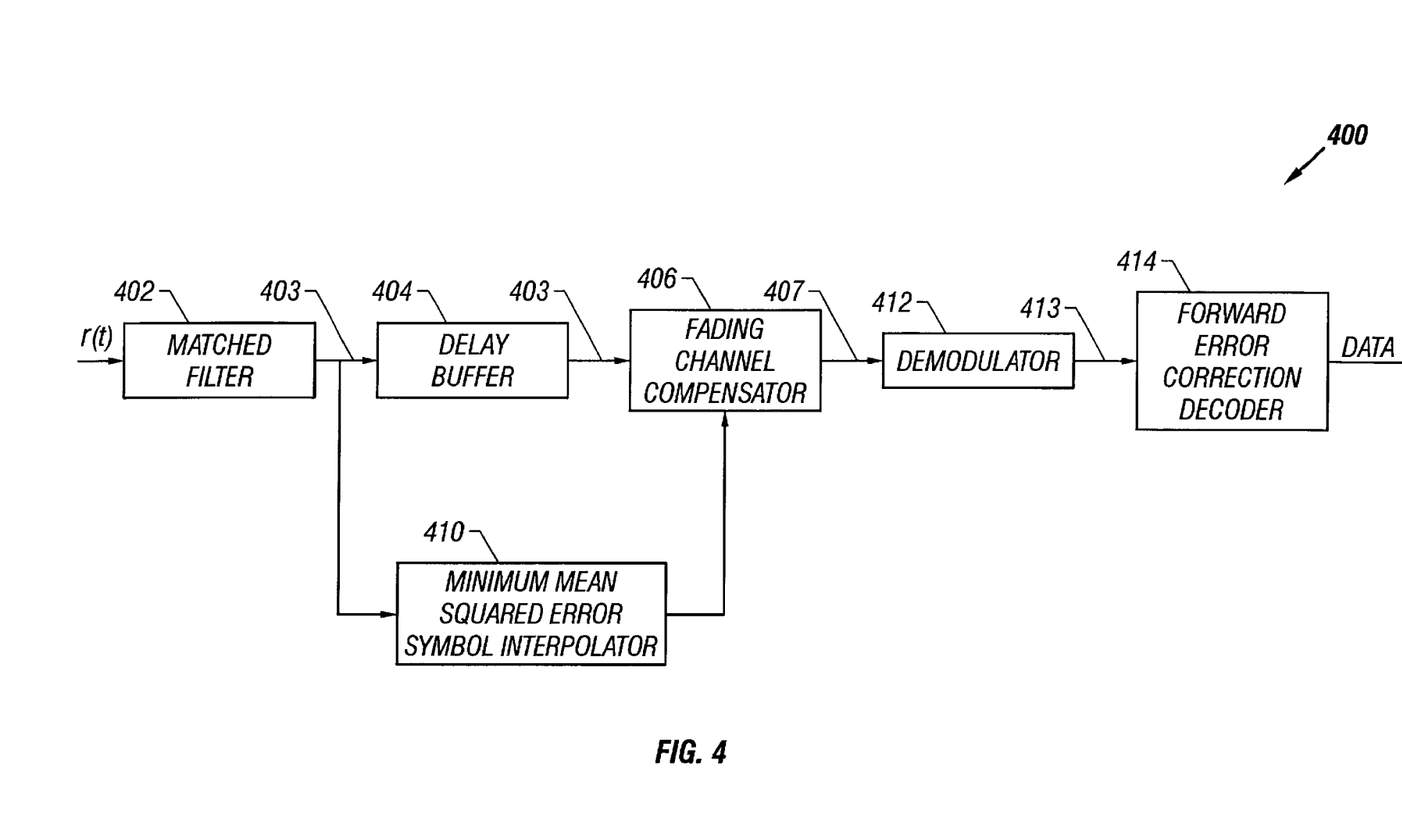
FIG. 4 is a diagram of an exemplary apparatus for estimating and compensating for a fading channel according to the method of FIG. 3.

FIG. 4 is a block diagram of an exemplary apparatus 400 of the present invention for estimating and compensating for a fading channel according to the method of FIG. 3. Shown are received data bursts r(t), a matched filter 402, matched filter data 403, a delay buffer 404, a fading channel compensator 406, phase corrected data 407, a minimum mean squared error symbol interpolator 410, a demodulator 412, free data 413, a forward error correction decoder 414, and the output data.

The matched filter 402 inputs the data bursts r(t) to maximize signal-to-noise ratio of the matched filter data 403 as explained above. The delay buffer 404 delays the arrival of matched filter data 403 at the input of the fading channel compensator 406 to coincide with a fading channel estimate input from the minimum mean squared error symbol interpolator 410. The minimum mean squared error symbol interpolator 410 interpolates between the reference symbol sets in the matched filter data 403 to generate a fading channel estimate with minimum error variance as explained above. The fading channel compensator 406 applies phase corrections to the matched filter data 403 based on the fading channel estimate input from the minimum mean squared error symbol interpolator 410 to generate the phase corrected data 407. The demodulator 412 demodulates the phase corrected data 407 and strips the free data 413. The optional forward error correction decoder 414 may be included at the output of the demodulator 412 to apply forward error correction decoding to the free data 413 according to well known techniques.

Figure 5:
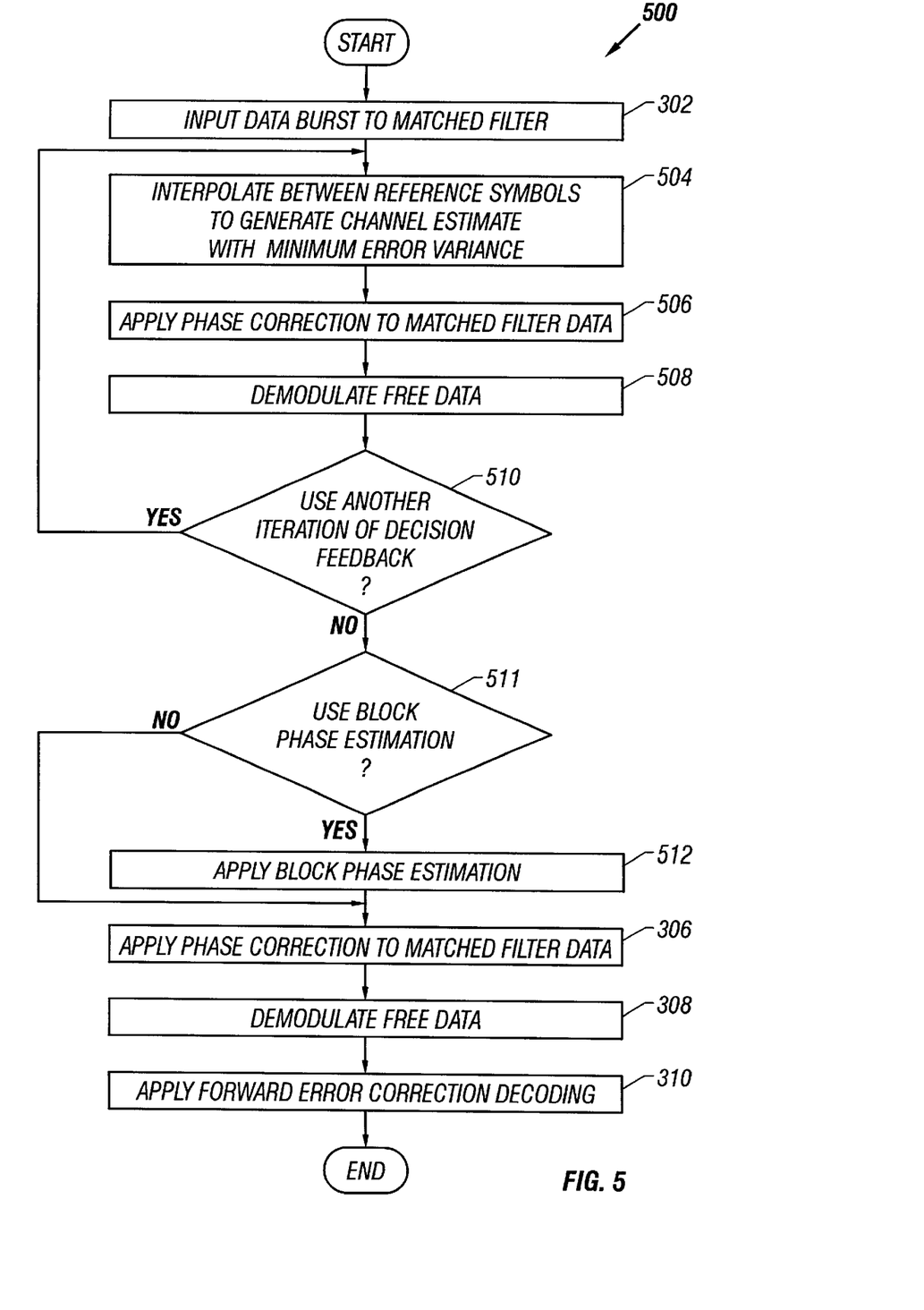
FIG. 5 is a flow chart of an exemplary method for estimating and compensating for a fading channel using decision feedback according to still another embodiment of the present invention.

FIG. 5 is a flow chart of an exemplary method 500 for estimating and compensating for a fading channel using decision feedback. In this example, relevant information describing the fading channel that is carried by the free data symbols located between the reference symbol sets is used in conjunction with the reference symbols by feeding back the decisions from the interpolation of the reference symbols, i.e., decision feedback. Decision feedback may be performed iteratively on the free data to further improve the fading channel estimate as follows.

A received data burst is input to a matched filter at step 302 to generate matched filter data having a maximum signal-to-noise ratio. The matched filter data is then interpolated between the reference symbol sets by a minimum mean squared error linear filter at step 504 to generate a fading channel estimate with minimum error variance. Phase corrections from the fading channel estimate are then applied to the matched filter data at step 506 to generate phase corrected data. At step 508 the phase corrected data is demodulated to recover the free data.

If another iteration of decision feedback is selected at step 510, then the free data symbols are iteratively interpolated at step 504 to improve the fading channel estimate. The number of reference symbols is thus effectively increased without increasing the message overhead.

If the option of block phase estimation is selected at step 511, then block phase estimation (BPE) is applied to the improved fading channel estimate at step 512 to further improve the fading channel estimate. The block phase estimation will be further explained later. At step 306, phase corrections from the fading channel estimate are applied to the matched filter data to generate phase corrected data as described above for FIG. 3. At step 308, the phase corrected data is demodulated to strip the free data as described above for FIG. 3. At step 310, forward error decoding may be applied to the free data as described above for FIG. 3.

Figure 6:
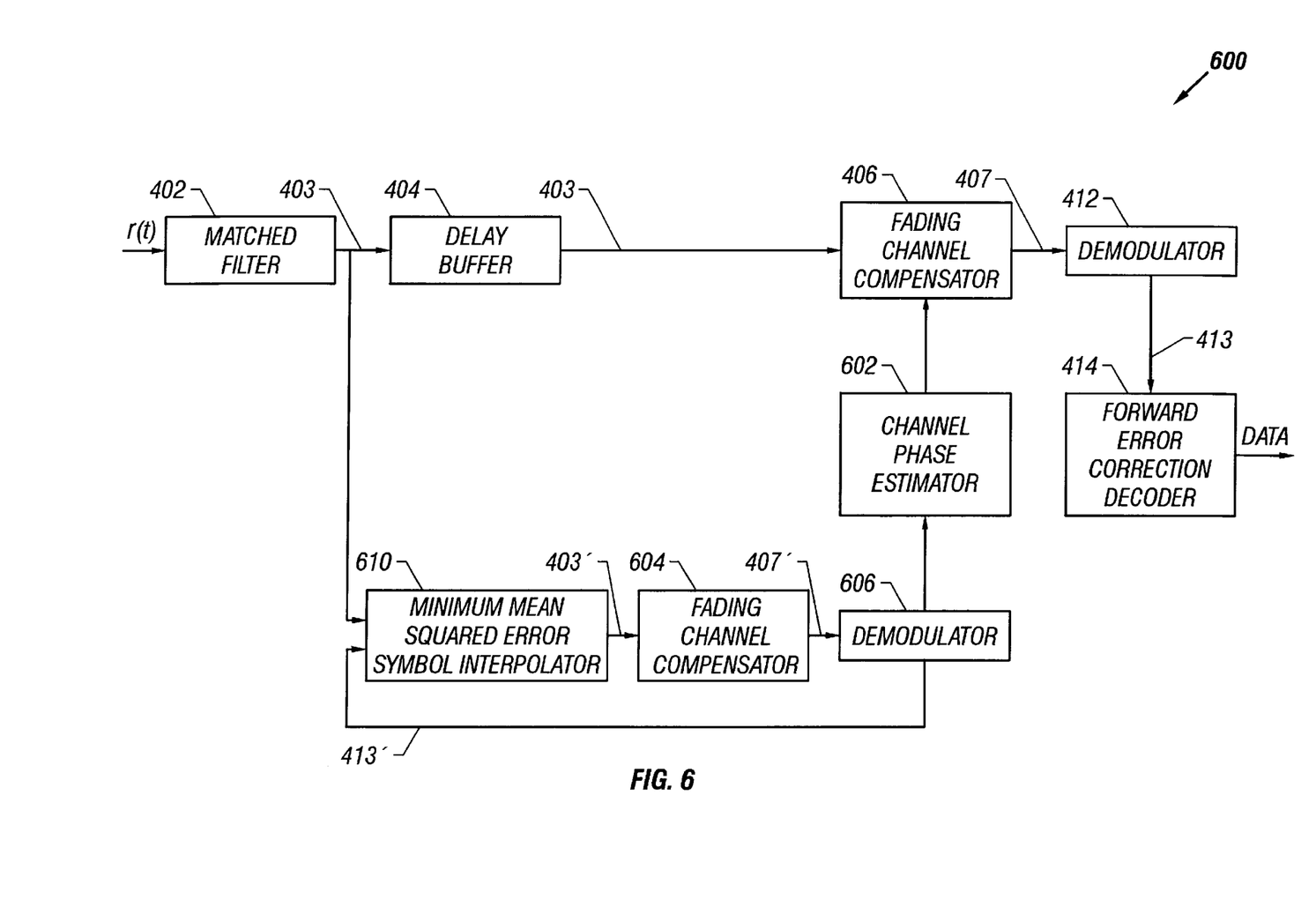
FIG. 6 is a diagram of an exemplary apparatus for estimating and compensating for a fading channel according to the method of FIG. 5.

FIG. 6 is a diagram of an exemplary apparatus 600 for estimating and compensating for a fading channel according to the method of FIG. 5. Shown are received data bursts r(t), a matched filter 402, matched filter data 403, decision feedback matched filter data 403', a delay buffer 404, a fading channel compensator 406, phase corrected data 407, decision feedback phase corrected data 407', a demodulator 412, free data 413, decision feedback free data 413', a forward error correction decoder 414, a fading channel phase estimator 602, a second fading channel compensator 604, a second demodulator 606, a minimum mean squared error symbol interpolator 610, and the output data.

The matched filter 402 inputs data bursts r(t) to maximize signal-to-noise ratio of matched filter data 403 as explained above for the example of FIG. 4. The delay buffer 404 delays the arrival of matched filter data 403 at the input of the fading channel compensator 406 to coincide with a fading channel estimate input from the fading channel phase estimator 602. The minimum mean squared error symbol interpolator 610 interpolates between the reference symbol sets in the matched filter data 403 to generate a fading channel estimate with minimum error variance as explained above. The second fading channel compensator 604 applies phase corrections to the decision feedback matched filter data 403' based on the fading channel estimate input from the minimum mean squared error symbol interpolator 610 to generate the decision feedback phase corrected data 407'. The second demodulator 606 demodulates the decision feedback phase corrected data 407' and strips the decision feedback free data 413'. The decision feedback free data 413' may be fed back to the minimum mean squared error symbol interpolator 610 and iteratively interpolated to further improve the fading channel estimate as described above in the method of FIG. 5.

The fading channel phase estimator 602, if included, inputs the fading channel estimate from the demodulator 606 and applies block phase estimation to further improve the fading channel estimate. The fading channel phase estimator 602 performs a function similar to block phase estimation, except that non-linearities are not introduced to remove the modulation. In conventional block phase estimation, fourth-order power non-linearities are introduced that magnify the accompanying noise and are a main cause of performance degradation associated with conventional block phase estimation techniques. In contrast to conventional techniques, in this method the modulation is removed by demodulating the free data using the fading channel estimate from the minimum mean squared error interpolation. The fading channel phase estimator 602 segments a data burst into K blocks of size L during which phase variation is considered small. A phase estimate in the middle of each block is evaluated by the optimal maximum-likelihood estimator as $$\hat{\theta}_k = \tan^{-1}\left(\frac{\sum_{n \in L} \text{Im}\{r_{comp}[n]\}}{\sum_{n \in L} \text{Re}\{r_{comp}[n]\}}\right) \quad k = 0, 1, \ldots, K-1 \quad (24)$$

where $$r_{comp}[k] = r[k] \cdot \exp(-j\hat{\theta}_{data}[k]) \quad (25)$$

where r[k] is the matched filter output and $\hat{\theta}_{data}[k]$ is the demodulated data using the fading channel estimate from the minimum mean squared error symbol interpolator 610. Phase unwrapping is then applied because of the sharp phase discontinuities in the inverse tangent function. A linear interpolation is made between the phases estimated in equation (24) after phase unwrapping to obtain the intermediate values of the fading channel phase at each symbol. The choice of the block size L and the number of blocks M may be optimized by simulation. For slow fading, a larger block size L is preferable to improve the accuracy of the phase estimate in the middle of the block. For fast fading, however, a smaller block size is preferable to satisfy the condition of almost constant phase value within the block.

The fading channel phase estimator 602 applies block phase estimation to the decision feedback free data 413' and outputs an improved fading channel estimate to the fading compensator 406. The fading channel compensator 406 applies phase corrections to the matched filter data based on the fading channel estimate input from the fading channel phase estimator 602 or the demodulator 606 to generate the phase corrected data 407. The demodulator 412 demodulates the phase corrected data 407 and strips the free data 413. The forward error correction decoder 414 may optionally included at the output of the demodulator 412 to apply forward error correction decoding to the free data 413 prior to the next fading channel estimation according to well known techniques.

Figure 7:
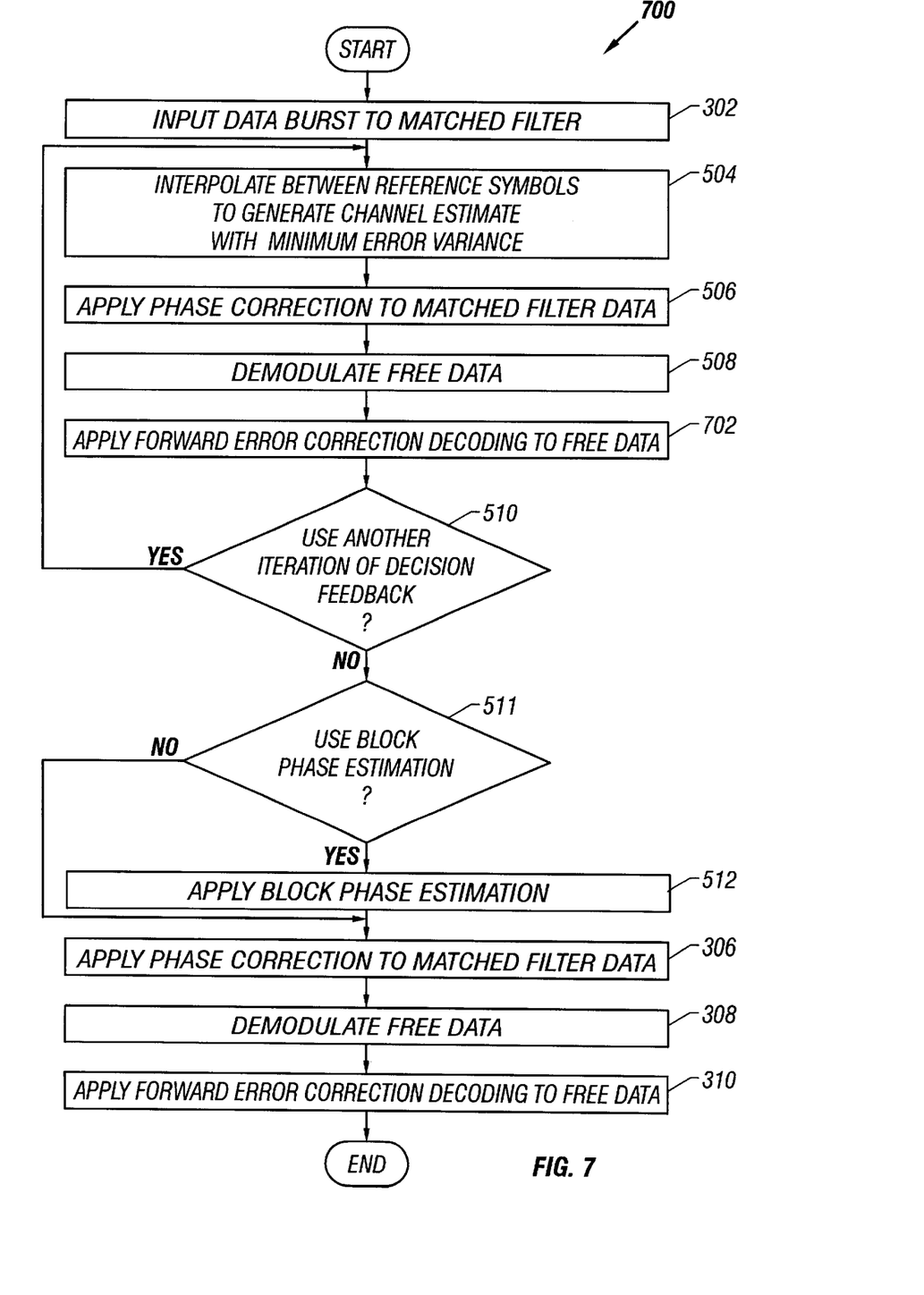
FIG. 7 is a flow chart of an exemplary method for estimating and compensating for a fading channel using decision feedback with forward error decoding correction according to another embodiment of the present invention.

FIG. 7 is a flow chart of an exemplary method 700 for estimating and compensating for a fading channel using decision feedback with forward error correction (FEC). Except for the step of applying forward error correction to the free data at step 702, the steps are the same as explained for FIG. 5.

The application of forward error correction decoding in conjunction with minimum mean squared error interpolation is a departure from conventional methods. Using forward error correction decoding prior to fading channel phase estimation advantageously improves the reliability of the fading channel estimate in specific applications.

Figure 8:
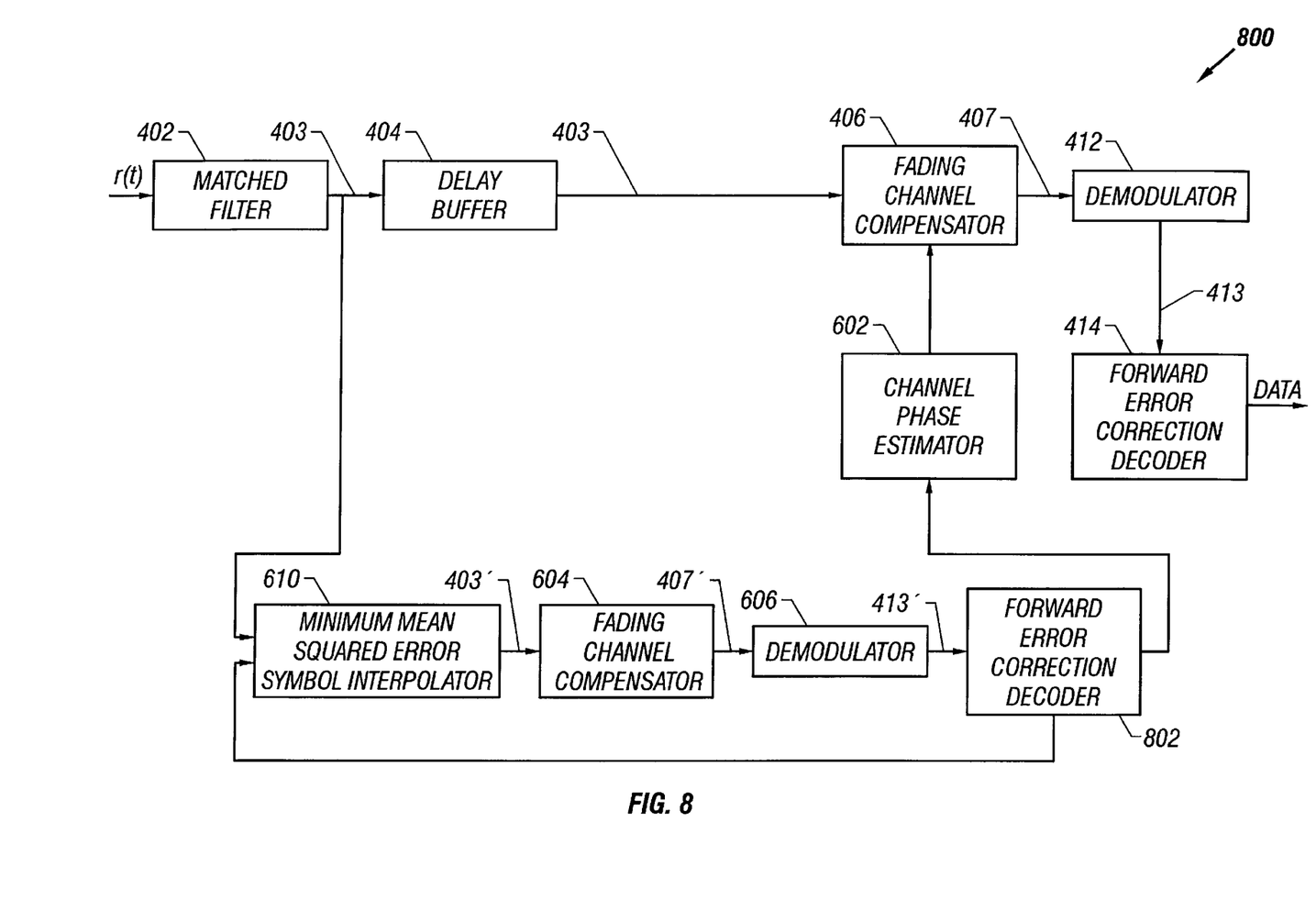
FIG. 8 is a diagram of an exemplary apparatus for estimating and compensating for a fading channel according to the method of FIG. 7.

FIG. 8 is a diagram of an exemplary apparatus 800 for estimating and compensating for a fading channel according to the method of FIG. 7. FIG. 8 is similar to FIG. 6, except for the addition of a second forward error decoder 802 after the demodulator 606. The forward error decoder advantageously avoids the introduction of fourth-order power non-linearities in the block phase estimate as described above.

Figure 9:
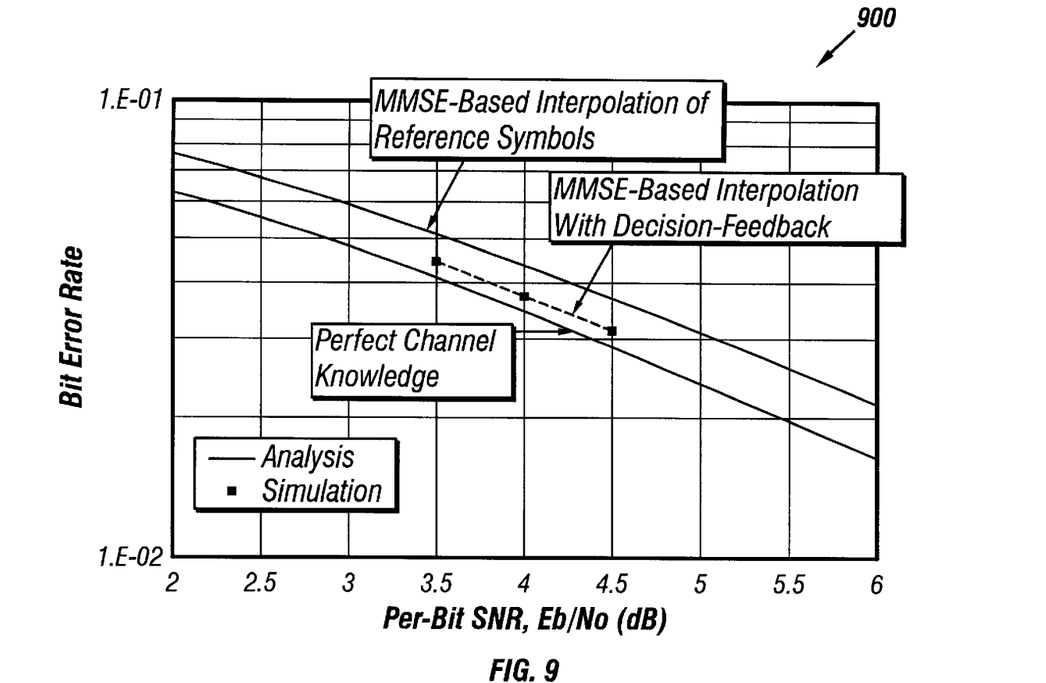
FIG. 9 is a typical plot of bit error rate as a function of per-bit signal-to-noise ratio for perfect channel knowledge, minimum mean squared error interpolation, and minimum mean squared error interpolation with decision feedback for a traffic channel data burst with a Rice factor of 7 dB and a fading bandwidth of 200 Hz.

FIG. 9 is a typical plot 900 of bit error rate as a function of per-bit signal-to-noise ratio for perfect channel knowledge, minimum mean squared error interpolation, and minimum mean squared error interpolation with decision feedback for a traffic channel data burst with a Rice factor of 7 dB and a fading bandwidth of 200 Hz. For a bit error rate of 3%, the required signal energy is reduced by 0.5 dB when using the minimum mean squared error interpolation with decision feedback, compared with using minimum mean squared error interpolation alone. Further, this new method achieves performance that is very close to that of an ideal system with channel knowledge.

Figure 10:
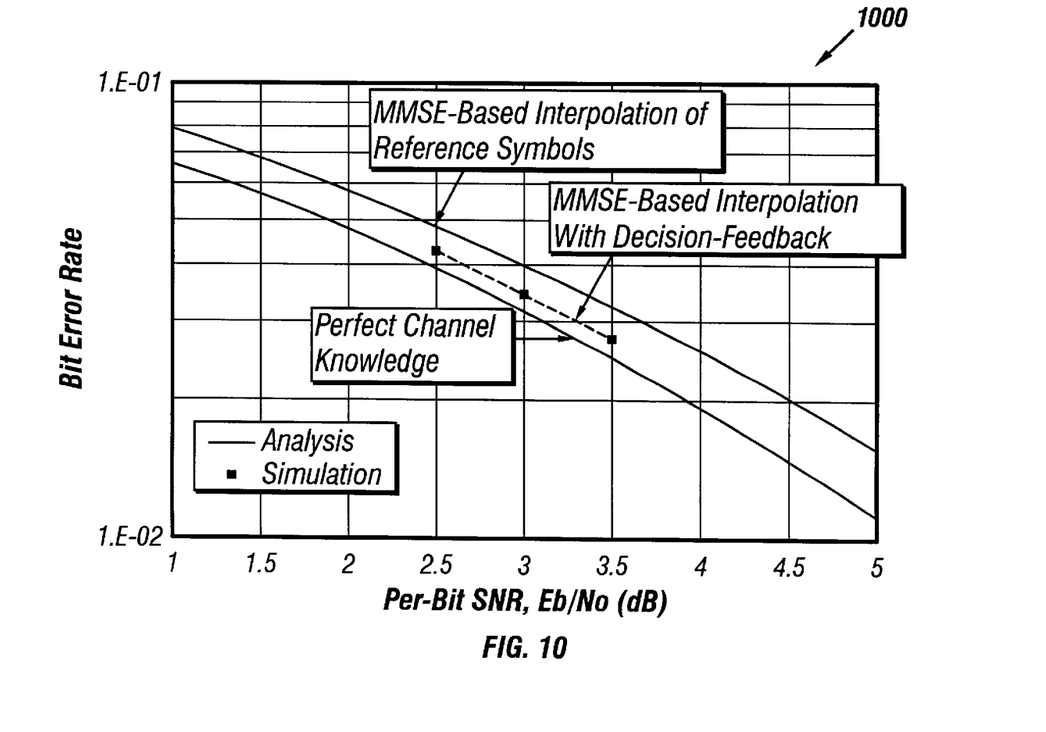
FIG. 10 is a typical plot of bit error rate as a function of per-bit signal-to-noise ratio for perfect channel knowledge, minimum mean squared error interpolation, and minimum mean squared error interpolation with decision feedback for a traffic channel data burst with a Rice factor of 12 dB and a fading bandwidth of 200 Hz.

FIG. 10 is a typical plot 1000 of bit error rate as a function of per-bit signal-to-noise ratio for perfect channel knowledge, minimum mean squared error interpolation, and minimum mean squared error interpolation with decision feedback for a traffic channel data burst with a Rice factor of 12 dB and a fading bandwidth of 200 Hz. For a bit error rate of 3%, the required signal energy is reduced by 0.5 dB when using the minimum mean squared error interpolation with decision feedback, compared with using minimum mean squared error interpolation alone. Further, this new method achieves performance that is very close to that of an ideal system with channel knowledge.

Figure 11:
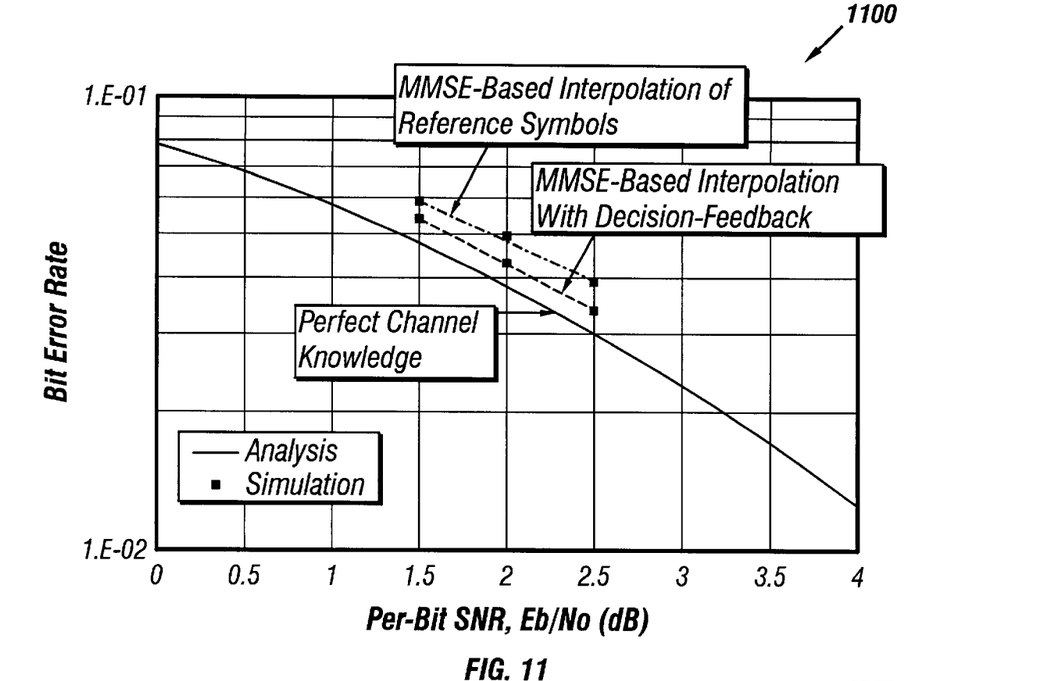
FIG. 11 is a typical plot of bit error rate as a function of per-bit signal-to-noise ratio for perfect channel knowledge, minimum mean squared error interpolation, and minimum mean squared error interpolation with decision feedback for a traffic channel data burst with additive white Gaussian noise.

FIG. 11 is a typical plot 1100 of bit error rate as a function of per-bit signal-to-noise ratio for perfect channel knowledge, minimum mean squared error interpolation, and minimum mean squared error interpolation with decision feedback for a traffic channel data burst with additive white Gaussian noise. For a bit error rate of 4%, the required signal energy is reduced by 0.5 dB when using the minimum mean squared error interpolation with decision feedback, compared with using minimum mean squared error interpolation alone. Further, this new method achieves performance that is very-close to that of an ideal system with channel knowledge.

It is clear from FIGS. 9–11 that combining minimum mean squared error interpolation with decision feedback of free data provides superior performance.

Figure 12:
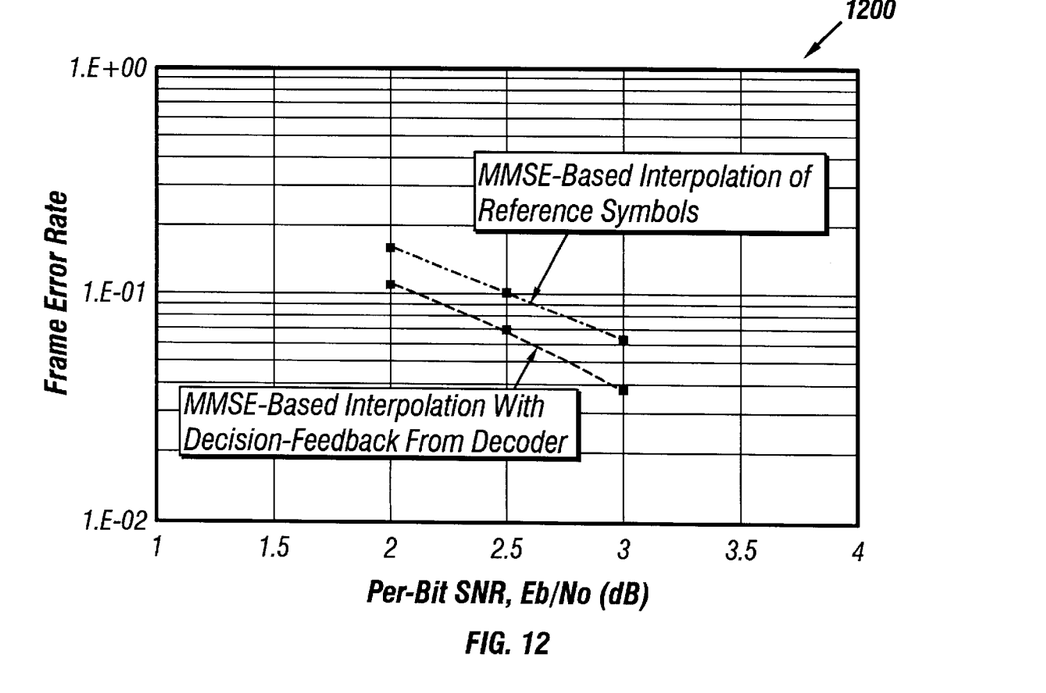
FIG. 12 is a typical plot of frame error rate as a function of per-bit signal-to-noise ratio for minimum mean squared error interpolation and minimum mean squared error interpolation with decision feedback for a broadcast channel data burst with additive white Gaussian noise.

FIG. 12 is a typical plot 1200 of frame error rate as a function of per-bit signal-to-noise ratio for minimum mean squared error interpolation and minimum mean squared error interpolation with decision feedback for a broadcast channel data burst with additive white Gaussian noise. For a frame error rate of 10%, the required signal energy is reduced by 0.5 dB when using the minimum mean squared error interpolation with decision feedback, compared with using minimum mean squared error interpolation alone. Decision feedback here incorporates forward error correction decoding of free data.

Figure 13:
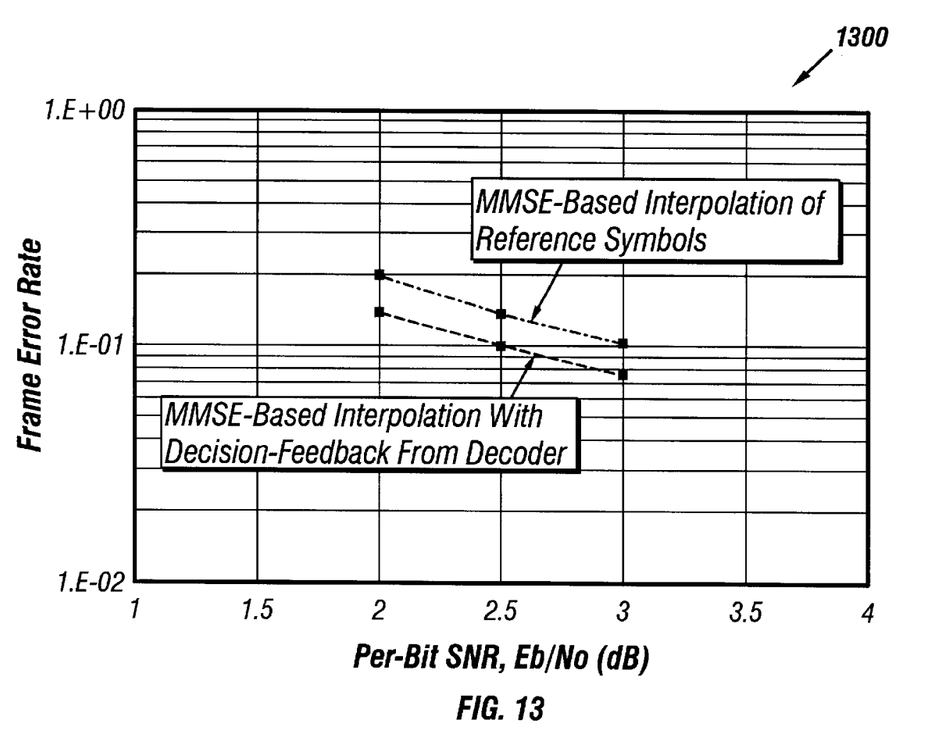
FIG. 13 is a typical plot of frame error rate as a function of per-bit signal-to-noise ratio for minimum mean squared error interpolation and minimum mean squared error interpolation with decision feedback from forward error decoding for a broadcast channel data burst with a Rice factor of 0 dB and a fading bandwidth of 20 Hz.

FIG. 13 is a typical plot 1300 of frame error rate as a function of per-bit signal-to-noise ratio for minimum mean squared error interpolation and minimum mean squared error interpolation with decision feedback from forward error decoding for a broadcast channel data burst with a Rice factor of 0 dB and a fading bandwidth of 20 Hz. For a frame error rate of 10%, the required signal energy is reduced by 0.5 dB when using the minimum mean squared error interpolation with decision feedback, compared with using minimum mean squared error interpolation alone. Decision feedback here incorporates forward error correction decoding of free data.

It is clear from FIGS. 12 and 13 that combining minimum mean squared error interpolation with decision feedback of forward error correction decoded free data provides superior performance.

Other modifications, variations, and arrangements of the present invention may be made in accordance with the above teachings other than as specifically described to practice the invention within the spirit and scope defined by the following claims.

What is claimed is:

1. A method for estimating a fading communications channel comprising the following steps:
    (a) generating matched filter data from a received data burst;
    (b) interpolating between reference symbols to generate a fading channel estimate from the matched filter data, and calculating linear filter coefficients as an inverse of an auto-correlation matrix multiplied by a covariance vector;
    (c) applying a phase correction to the matched filter data from the fading channel estimate to recover free data from the matched filter data; and
    (d) performing decision feedback on the free data.

2. The method of claim 1 wherein the linear filter coefficients are calculated for a Rician fading channel.

3. An apparatus for estimating and compensating for a fading communications channel comprising:
    a matched filter for generating matched filter data from a received data burst;
    a reference symbol interpolator coupled to the matched filter for interpolating between reference symbols to generate a fading channel estimate from the matched filter data;
    a first fading channel compensator coupled to the matched filter for applying a phase correction to the matched filter data from the fading channel estimate to generate phase corrected data;
    a first demodulator coupled to the fading channel compensator for demodulating free data from the phase corrected data;
    a forward error correction decoder coupled to the first demodulator;
    a second fading channel compensator coupled to the reference symbol interpolator for applying a phase correction to the matched filter data from the fading channel estimate to generate phase corrected data.

4. The apparatus of claim 3, further comprising a second demodulator coupled to the second fading channel compensator for demodulating free data from the phase corrected data.

5. The apparatus of claim 4 wherein the free data is input to the reference symbol interpolator to improve the fading channel estimate by decision feedback.

6. The apparatus of claim 5 further comprising a fading channel phase estimator coupled to the second demodulator for applying block phase estimation to improve the fading channel estimate.

7. The apparatus of claim 4 further comprising a second forward error correction decoder coupled to the second demodulator.

8. The apparatus of claim 7 wherein an output of the second forward error correction decoder is input to the reference symbol interpolator to improve the fading channel estimate by decision feedback.

9. The apparatus of claim 4 further comprising a fading channel phase estimator coupled to the second forward error correction decoder for applying block phase estimation to improve the fading channel estimate.

10. The apparatus of claim 3 wherein the reference symbol interpolator calculates linear filter coefficients as an inverse of an auto-correlation matrix multiplied by a covariance vector.

11. The apparatus of claim 10 wherein the linear filter coefficients are calculated for a Rician fading channel.

\* \* \* \* \*